United States Patent
Kano (10) Patent No.: US 8,065,892 B2
(45) Date of Patent: Nov. 29, 2011

(54) DEVICE FOR MANUFACTURING SHEET GLASS AND METHOD FOR MANUFACTURING SHEET GLASS

(75) Inventor: Tomonori Kano, Shigaken (JP)

(73) Assignee: Nippon Electric Glass Co., Ltd., Shigaken (JP)

( * ) Notice: Subject to any disclaimer, the term of this patent is extended or adjusted under 35 U.S.C. 154(b) by 822 days.

(21) Appl. No.: 11/791,726

(22) PCT Filed: Nov. 7, 2005

(86) PCT No.: PCT/JP2005/020382
§ 371 (c)(1), (2), (4) Date: Jun. 27, 2008

(87) PCT Pub. No.: WO2006/070532
PCT Pub. Date: Jul. 6, 2006

(65) Prior Publication Data
US 2009/0013725 A1    Jan. 15, 2009

(30) Foreign Application Priority Data
Dec. 28, 2004    (JP) .................................. 2004-380255

(51) Int. Cl.
C03B 17/00 (2006.01)
C03B 17/06 (2006.01)
(52) U.S. Cl. .......................................... 65/324; 65/99.1
(58) Field of Classification Search ............. 65/90, 99.1, 65/324, 333
See application file for complete search history.

(56) References Cited

U.S. PATENT DOCUMENTS

| | | | |
|---|---|---|---|
| 2003/0029199 A1* | 2/2003 | Pitbladdo | 65/195 |
| 2003/0110804 A1 | 6/2003 | Fenn et al. | |
| 2004/0154336 A1 | 8/2004 | Pitbladdo | |
| 2006/0016219 A1* | 1/2006 | Pitbladdo | 65/29.21 |
| 2007/0068197 A1* | 3/2007 | Pitbladdo | 65/90 |

FOREIGN PATENT DOCUMENTS

| | | |
|---|---|---|
| JP | 10-025120 | 1/1986 |
| JP | 61-021928 | 1/1986 |
| JP | 2001-080922 | 3/2001 |
| WO | 03/051783 | 6/2003 |

OTHER PUBLICATIONS

Supplementary European Search Report issued Nov. 4, 2010 in corresponding European Application No. 05800316.1.

* cited by examiner

*Primary Examiner* — Matthew Daniels
*Assistant Examiner* — Cynthia Szewczyk
(74) *Attorney, Agent, or Firm* — Wenderoth, Lind & Ponack, L.L.P.

(57) ABSTRACT

A supplying tube for a molten glass, which is placed in a downstream end portion of a supplying passage directing the molten glass flowing out of a melting furnace to a forming vessel in a forming furnace, has a small diameter tube portion which has a small flow passage area and is provided at an upstream side, and a large diameter tube portion which is provided at a downstream side of the small diameter tube portion and has a large flow passage area. An expanded diameter tube portion of which flow passage area gradually expands toward the downstream side is interposed between the small diameter tube portion and the large diameter tube portion. The small diameter tube portion, the expanded diameter tube portion, and the large diameter tube portion may be integrally and continuously connected to one another.

9 Claims, 5 Drawing Sheets

DEVICE FOR MANUFACTURING SHEET GLASS AND METHOD FOR MANUFACTURING SHEET GLASS

FIELD OF THE INVENTION

The present invention relates to a device and a method for manufacturing sheet glass. In particular, the present invention relates to a technique of appropriately supplying molten glass to a forming vessel in a forming furnace when a sheet glass is continuously formed from the molten glass within the forming furnace.

BACKGROUND OF THE INVENTION

In general, a down-draw process and an up-draw process are known as methods for continuously forming, from molten glass, a sheet glass used in the manufacture of a flat display or the like such as by liquid crystal display. The down-draw process is basically classified into an overflow down-draw process and a slot down-draw process.

Figure 4A:
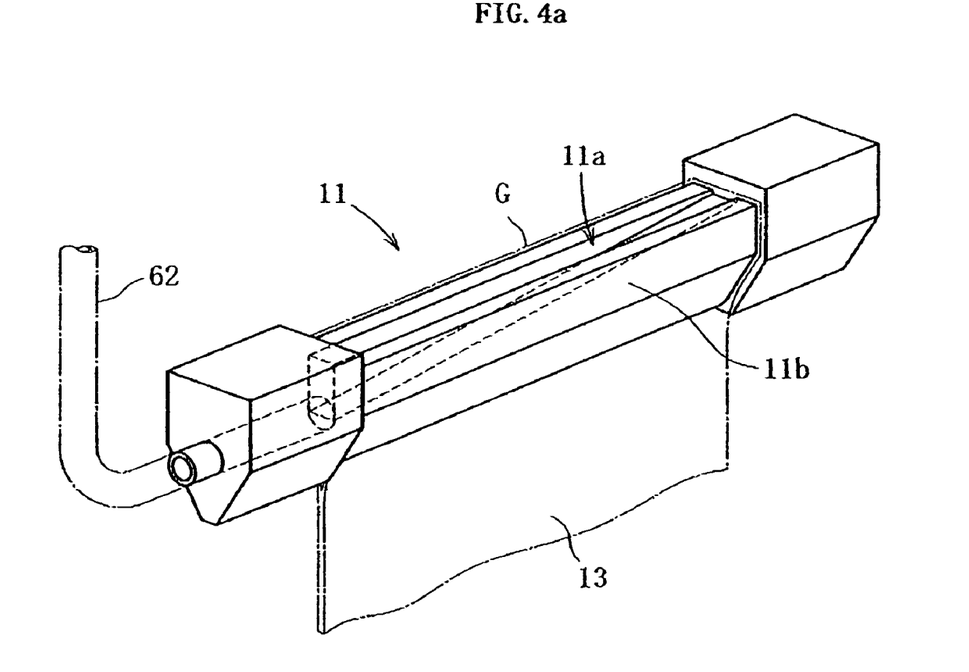
FIG. 4a is a perspective view showing essential parts of a conventional device for manufacturing sheet glass.
Figure 4B:
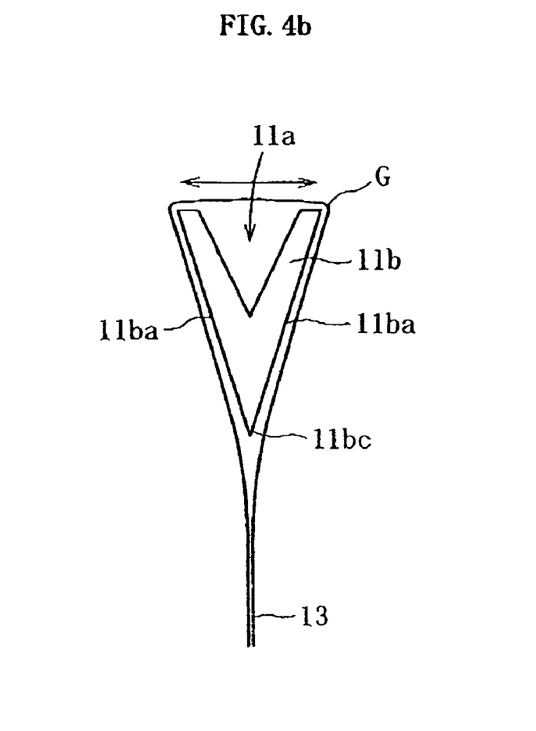
FIG. 4b is a longitudinal side view (diagram from which hatching is omitted) of essential parts showing an operation of the device.

As an example, means for manufacturing sheet glass by the overflow down-draw process will be described. The temperature of molten glass obtained by heating a glass raw material in a melting furnace is reduced until the molten glass has a viscosity suitable for the formation. Thereafter, the molten glass is flown down in a supplying tube 62 shown in FIG. 4a provided at a downstream end portion of a supplying passage, and is continuously supplied from one side of a forming vessel (a groove-shaped overflow vessel) 11a formed on an upper portion of a formed body 11b having a cross-section of substantially wedge in the forming furnace 11. In general, a vessel (pot) is provided at an upper end of the supplying tube 62 such that the molten glass is subjected to soaking near the temperature suitable for the forming. Moreover, in the forming furnace 11, the molten glass G flown over the overflow vessel 11a flows down along both side surfaces 11ba of the formed body 11b to be fused at a lowest end 11bc, and the fused molten glass is drawn downwardly so that a sheet glass 13 is continuously formed, as shown in FIG. 4b.

However, such conventional method has led to the following problems. The molten glass flowing out of the melting furnace gradually reduces temperatures while moving downstream of the supplying passage, and is subjected to a temperature control to be supplied to the forming furnace when reaching the temperature suitable for the forming. In addition, since a viscosity of the molten glass increases as the temperature decreases, the flow of molten glass increases resistance as the molten glass moves to the downstream of the supplying passage. Therefore, as shown in FIG. 4a, when the supplying tube 62 is directly coupled to the forming furnace 11 (overflow vessel 11a) and has a constant diameter (flow passage area), a supplying amount of the molten glass to the forming furnace 11 is controlled by a resistance applied to the molten glass from a portion provided at the extreme downstream end of the supplying tube 62 near the forming furnace 11. For this reason, when a thickness distribution or the like of the sheet glass 13 is changed, the temperature of the portion of the supplying tube 62 near the forming furnace 11 must be changed so that the viscosity is adjusted to an appropriate value. However, in the conventional method, since the entire flow of the molten glass existing in the long passage of the supplying tube 62 is affected by the above temperature change, the flow rate of the molten glass supplied to the forming furnace 11 is likely to be changed rapidly and a relatively long time is required for reaching the steady state of the flow rate during which a good quality of sheet glass cannot be obtained.

Figure 5:
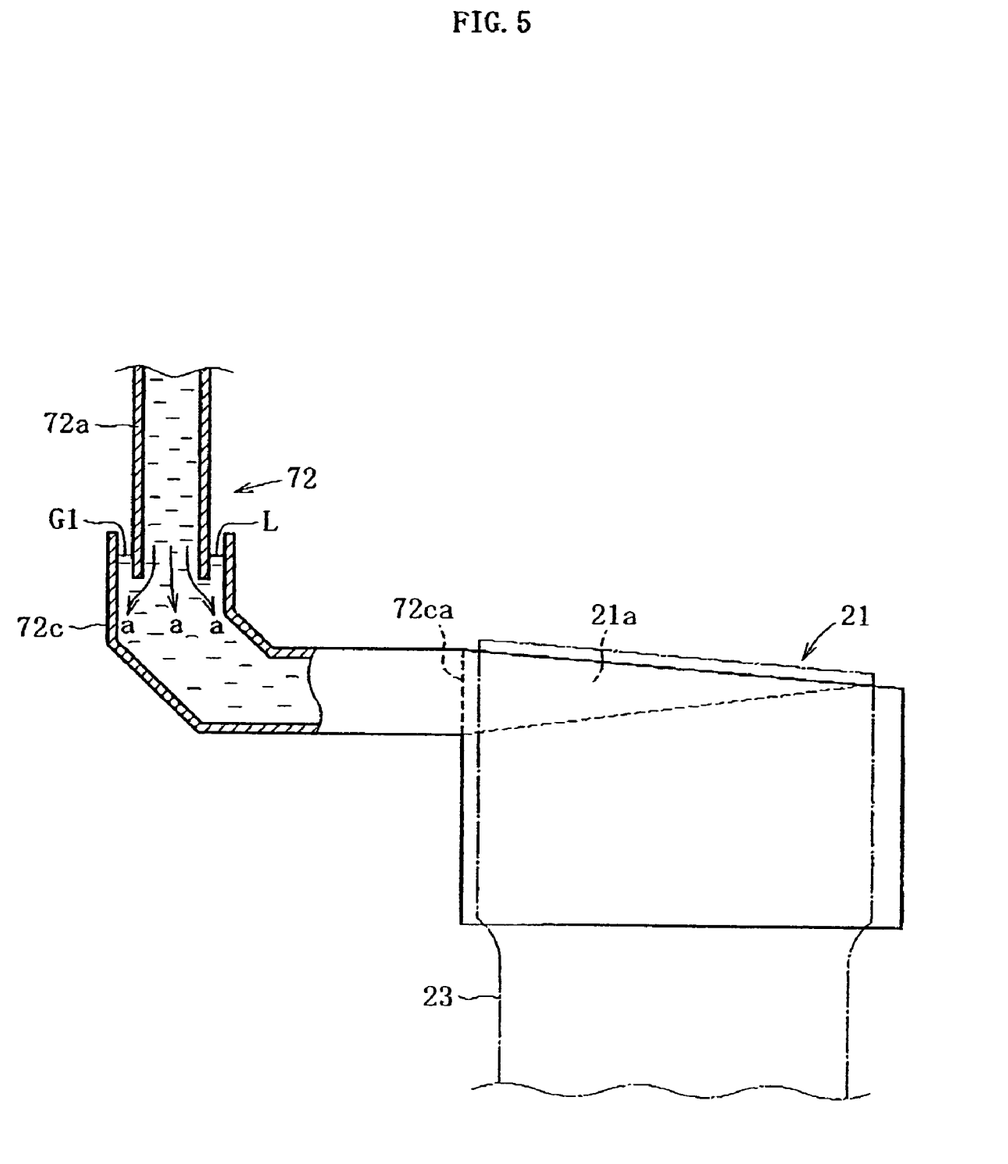
FIG. 5 is a schematic broken front view of essential parts showing a conventional device for manufacturing sheet glass.

As a structure addressing the problems, it has been known that the supplying tube is divided into a small diameter tube provided at the upstream side and a large diameter tube provided at the downstream side, a lower end of the small diameter tube is inserted into an upper end of the large diameter tube, and the molten glass flowing into the large diameter tube from the small diameter tube is supplied to the forming vessel in the forming furnace (see e.g., Patent Documents 1 and 2 listed below). More specifically, as schematically shown in FIG. 5, a supplying tube 72, which is provided at a downstream end portion of the supplying passage of the molten glass from the melting furnace to a forming furnace 21, is composed of a small diameter tube 72a of which upstream end is connected to, for example, a vessel for soaking the molten glass, and a large diameter tube 72c of which downstream end 72ca is connected to one side of an overflow vessel 21a in the forming furnace 21, and the downstream end portion of the small diameter tube 72a is inserted into the inside of the upstream end portion of the large diameter tube 72c. According to such structure, even when the temperature near the downstream end 72ca of the large diameter tube 72c is changed during the changing of thickness distribution or the like of a sheet glass 23, a fluid level L of the molten glass at the upstream end portion of the large diameter tube 72c merely moves up and down and the flow of the molten glass in the small diameter tube 72a is little affected. Therefore, the flow rate of the molten glass is prevented from changing rapidly. As a result, it is possible to change thickness distribution or the like of the sheet glass 23 while maintaining a stable flow rate.

[Patent Document 1] JP No. 2001-80922A
[Patent Document 2] United States Patent Application Publication No. 2003/0110804

SUMMARY OF THE INVENTION

However, according to the structure shown in FIG. 5, in particular the structure disclosed in Patent Document 1, since the molten glass flowing into the large diameter tube 72c from the small diameter tube 72a mainly flows along a passage indicated by the arrow a, a flow speed of a molten glass G1 existing in an overlapping portion between the large diameter tube 72c and the small diameter tube 72a is significantly reduced or temporarily stopped.

The generation of such event causes the molten glass G1 of which flow speed is reduced or stopped to be subjected to devitrification and the devitrification leaves defects in the sheet glass 23, leading to the reduction in quality of the sheet glass 23 and thus the reduction in production yield. In addition, since the inner surface of the large diameter tube 72c (as well as the inner surface of the small diameter tube 72a) is generally formed with platinum, a contact time between the molten glass G1 and the platinum becomes inappropriately longer when the molten glass G1 is stopped. This causes a blister to be easily generated at a platinum interface and generates a concern of including bubbles in the sheet glass. This also leads to the reduction in quality or yield of the sheet glass 23.

Patent Document 2 discloses that the lower end of the small diameter tube 72a is arranged near a free surface of the molten glass in the upper end portion of the large diameter tube 72c. Taking into consideration the fact that the fluid level L of the molten glass in the upstream end portion of the large diameter tube 72c moves up and down as described above, such arrangement is significantly difficult, leading to the problems generated by inability of complete elimination of the significant reduction or stop of the flow speed of the molten glass G1 as described above. In addition, since bubbles are generated due to the inclusion of an atmospheric gas at the lower end of the small diameter tube 72a, the reduction in the quality or the production yield of sheet glass becomes a concern.

The aforementioned problems may also arise when the sheet glass is formed by not only the overflow down-draw process but also the slot down-draw process.

SUMMARY OF THE INVENTION

The present invention is invented in the light of the above circumstances, and a technical object is to suppress a rapid change of the flow rate of the molten glass supplied from the downstream end of the supplying tube to the forming vessel in the forming furnace, and moreover to avoid devitrification or the bubble generation due to the partial reduction or stop of the flow speed of the molten glass, and thus to achieve improvement of the quality and the production yield of the sheet glass.

The present invention invented to attain the aforementioned object is a device for manufacturing sheet glass constituted such that a sheet glass is continuously formed by continuously directing a molten glass flowing out of a melting furnace through a supplying passage to a forming vessel in a forming furnace, characterized in that a supplying tube of the molten glass, which is placed in a downstream end portion of the supplying passage and leads to the forming vessel in the forming furnace, has a small diameter tube portion which has a small flow passage area and is provided at an upstream side, and a large diameter tube portion which is provided at a downstream side and has a large flow passage area, and an expanded diameter tube portion of which flow passage area gradually expands toward the downstream side is interposed between the small diameter tube portion and the large diameter tube portion.

According to the structure, the molten glass flowing out of the melting furnace flows down in the small diameter tube portion of the supplying tube and passes through the expanded diameter tube portion and the large diameter tube portion to be continuously supplied to the forming vessel in the forming furnace, so that the molten glass moves to the downstream end portion of the supplying passage. In this case, when the molten glass passes through the expanded diameter tube portion, i.e., the molten glass is being flown from the small diameter tube portion into the large diameter tube portion, and the molten glass flows in such a way that the flow gradually expands while moving downstream. Since the flow moves along the inner surface of the expanded diameter tube portion, it is possible to suppress the partial reduction or stop of the flow speed caused by the fact that the flow of the molten glass when flowing from the small diameter tube into the large diameter tube (therefore, flowing in such a way that the flow gradually expands while moving downstream) does not move along the inner surface of the tube as in the conventional art. Accordingly, it is possible to suppress the generation of devitrification due to the reduction or stop of the flow speed of the molten glass, and the bubble generation due to the contact between the molten glass and e.g., platinum provided on the inner surface of the tube for as long as possible. Therefore, the improvement of the quality and the production yield of the sheet glass can be achieved.

In the aforementioned structure, it is preferable that the small diameter tube portion, the expanded diameter tube portion, and the large diameter tube portion be integrally and continuously connected to one another.

This structure can ensure a sufficient head length during the flow-down of the molten glass, namely a distance from a fluid level at the upper end of the molten glass to a flow-out position of the molten glass in the forming vessel (in the case of the overflow down-draw process, an overflow surface of the molten glass), and the change of the flow rate with respect to the change of fluid level at the upper end of the molten glass is reduced. Therefore, it is possible to stably supply the molten glass from the downstream end of the large diameter tube portion to the forming vessel in the forming furnace. In addition, since the partial reduction or stop of the flow speed of the molten glass does not occur at all, likelihood of devitrification or the generation of bubbles due to the above reduction or stop are further ensured to be reduced. In addition, since the tube diameter of the supplying tube at the upstream is smaller than the downstream, a resistance applied to the moving molten glass is larger in the small diameter tube portion provided at the upstream and is smaller in the large diameter tube portion provided at the downstream. As a result, the amount of the molten glass supplied to the forming vessel in the forming furnace is controlled by the viscosity of the molten glass in the small diameter tube portion. Therefore, as compared with the case of the supplying tube 62 having a constant tube diameter as shown in FIG. 4a, more stable flow rate with respect to the temperature change near the forming furnace can be obtained. This has an advantage particularly in the case of employing the overflow down-draw process. In the process, a thickness distribution of the sheet glass is controlled by the flow rate and viscosity of the molten glass in the forming furnace, which is greatly affected by the viscosity and the flow rate of the molten glass in the supplying tube provided in proximity of the forming furnace. Since the process can stabilize the flow rate of the molten glass near the forming furnace, it can contribute to the stabilizing of the thickness distribution of the sheet glass. Moreover, even when the thickness distribution or the like of the sheet glass is changed, the flow rate of the molten glass supplied to the forming vessel in the forming furnace is suppressed from rapid change.

In the above structure, it is preferable that the small diameter tube portion is provided with heating means controlling a flow rate of the molten glass supplied to the forming vessel in the forming furnace through the large diameter tube portion.

According to this, the viscosity of the molten glass flowing in the small diameter tube portion is adjusted by the heating means, and thus the flow rate of the molten glass supplied to the forming vessel in the forming furnace through the large diameter tube portion is controlled. The heating in the small diameter tube portion is likely to transfer heat to the entire central portion of the flow of the molten glass because of the small flow passage area, and can quickly adjust the viscosity. Therefore, it is possible to easily and efficiently control the flow rate of the molten glass supplied to the forming vessel while maintaining a good responsiveness.

In the above structure, the forming vessel in the forming furnace may be a groove-shaped overflow vessel formed on an upper portion of a formed body having an approximately wedge-shaped cross-section.

According to this, the sheet glass can be preferably formed by the overflow down-draw process, and a good quality of sheet glass for liquid crystal display or the like can be provided.

In this case, it is preferable to select the tube diameter of the small diameter tube portion to appropriately correspond to the flow rate of the molten glass supplied to the forming vessel in the forming furnace, and to set the tube diameter of the large diameter tube portion to have substantially the same area as an inlet portion of the groove-shaped overflow vessel.

Moreover, a method according to the present invention made to attain the aforementioned object is a method for manufacturing sheet glass for continuously forming a sheet glass by continuously directing a molten glass flowing out of a melting furnace to a forming vessel in a forming furnace through a supplying passage, characterized in that after flowing down in a small diameter tube portion having a small flow passage area at a downstream end portion of the supplying passage and before flowing into a large diameter tube portion connected to the forming vessel in the forming furnace and having a large flow passage area, the molten glass passes through an expanded diameter tube portion having a gradually expanded flow passage area while moving to a downstream side.

According to the method, the molten glass flowing out of the melting furnace flows down in the small diameter tube portion of the supplying tube and passes through the expanded diameter tube portion and the large diameter tube portion to be continuously supplied to the forming vessel in the forming furnace, so that the molten glass moves to the downstream end portion of the supplying passage. Therefore, the method can enjoy the effect similar to the effect previously described on the associated operation in the above description of the device.

In the method, the molten glass preferably flows in a supplying tube formed with the small diameter tube portion, the expanded diameter tube portion, and the large diameter tube portion being integrally and continuously connected to one another.

Even in this case, the method can enjoy the effect similar to the effect previously described on the associated operation in the above description of the device, such as the reduction in the likelihood of devitrification or bubble generation.

In the above method, it is preferable that a flow rate of the molten glass supplied into the forming vessel in the forming furnace through the large diameter tube portion is controlled by controlling a temperature of the molten glass flowing down in the small diameter tube portion.

Even in this case, the viscosity is adjusted by controlling the temperature of the molten glass flowing down in the small diameter tube portion, and thus the flow late of the molten glass supplied to the forming vessel in the forming furnace through the large diameter tube portion is controlled. Hence, the method can enjoy the effect similar to the effect previously described on the associated operation in the above description of the device.

As described above, according to the present invention, during the process in which the molten glass flows from the small diameter tube portion to the large diameter tube portion through the expanded diameter tube portion, the flow that gradually expands while moving downstream is generated as a flow of the molten glass. Since the flow is along the inner surface of the expanded diameter tube portion, the partial reduction or stop of the flow speed of the molten glass can be suppressed. Accordingly, the likelihood of devitrification or bubble generation due to the reduction or stop of the flow speed of the molten glass is significantly reduced, and the improvement of quality or production yield of the sheet glass can be achieved. In addition, when the small diameter tube portion, the expanded diameter tube portion, and the large diameter tube portion are integrally and continuously connected to one another, the resistance which is applied to the molten glass from the tube during the movement is larger in the small diameter tube portion provided at the upstream and is smaller in the large diameter tube portion provided at the downstream, and thus the flow rate of the molten glass supplied to the forming vessel in the forming furnace is controlled by the viscosity of the molten glass in the small diameter tube portion. Therefore, the effect of temperature change on the flow rate near the forming furnace is small. As a result, even when the thickness distribution or the like of the sheet glass is changed, the flow rate of the molten glass supplied to the forming vessel in the forming furnace is prevented from being rapidly changed.

DESCRIPTION OF REFERENCES 1 forming furnace
1a overflow vessel (forming vessel)
2, 12, 22, 32, 42, 52 supplying tube
2a, 12a, 22a, 32a, 42a, 52a small diameter tube portion
2b, 12b, 22b, 32b, 42b, 52b expanded diameter tube portion
2c, 12c, 22c, 32c, 42c, 52c large diameter tube portion
3 sheet glass
4 temperature sensor (thermocouple)
5 heating means (heater)

DETAILED DESCRIPTION OF THE INVENTION

Hereinafter, embodiments of the present invention will be described with reference to accompanying drawings.

First, a device for manufacturing sheet glass according to a first embodiment of the present invention will be described with reference to FIG. 1. A supplying tube 2 connected to a forming vessel (a groove-shaped overflow vessel) 1a in a forming furnace 1 shown in the figure is provided in a downstream end portion of a supplying passage (all supplying passages) of a molten glass from a melting furnace (not shown) to the overflow vessel 1a. The supplying tube 2 is composed of: a small diameter tube portion 2a of which upstream end is connected to, for example, a vessel (not shown) for soaking the molten glass and which has a small flow passage area; an expanded diameter tube portion 2b which is integrally and continuously connected to the downstream end of the small diameter tube portion 2a and of which flow passage area (tube diameter) gradually expands toward the downstream; and a large diameter tube portion 2c which is integrally connected to the downstream end of the expanded diameter tube portion 2b and is connected to one side of the overflow vessel 1a in the forming furnace 1.

In this case, the small diameter tube portion 2a and the expanded diameter tube portion 2b are arranged to extend in the longitudinal direction while the large diameter tube portion 2c is arranged such that the upstream end portion extends in the longitudinal direction, the intermediate portion changes the direction, and the downstream end portion extends in the lateral direction. The molten glass flowing down in the small diameter tube portion 2a passes through the expanded diameter tube portion 2b and is continuously supplied from a downstream end 2ca of the large diameter tube portion 2c to the overflow vessel 1a in the forming furnace 1. Furthermore, the molten glass flown over the overflow vessel 1a flows down along both side surfaces of the formed body 1b to be fused at the lowest end, and the fused molten glass is drawn downwardly so that a sheet glass 3 is continuously formed.

A plurality of heating means (heaters) 5 are attached on the periphery of the small diameter tube portion 2a, the expanded diameter tube portion 2b, and the large diameter tube portion 2c, the heating means controlling the temperature based on a signal sent from a temperature sensor (thermocouple) 4. In this case, the heating means 5 and the temperature sensor 4 provided on the periphery of the small diameter tube portion 2a control the flow rate of the molten glass supplied from the downstream end 2ca of the large diameter tube portion 2c to the overflow vessel 1a in the forming furnace 1, and the heating means 5 and the temperature sensors 4 provided on the periphery of the other tube portions subsidiarily adjust the viscosity of the molten glass. Therefore, the supplying amount of the molten glass to the overflow vessel 1a is mainly controlled by the temperature control with respect to the small diameter tube portion 2a, that is, the viscosity of the molten glass in the small diameter tube portion 2a.

Figure 1:
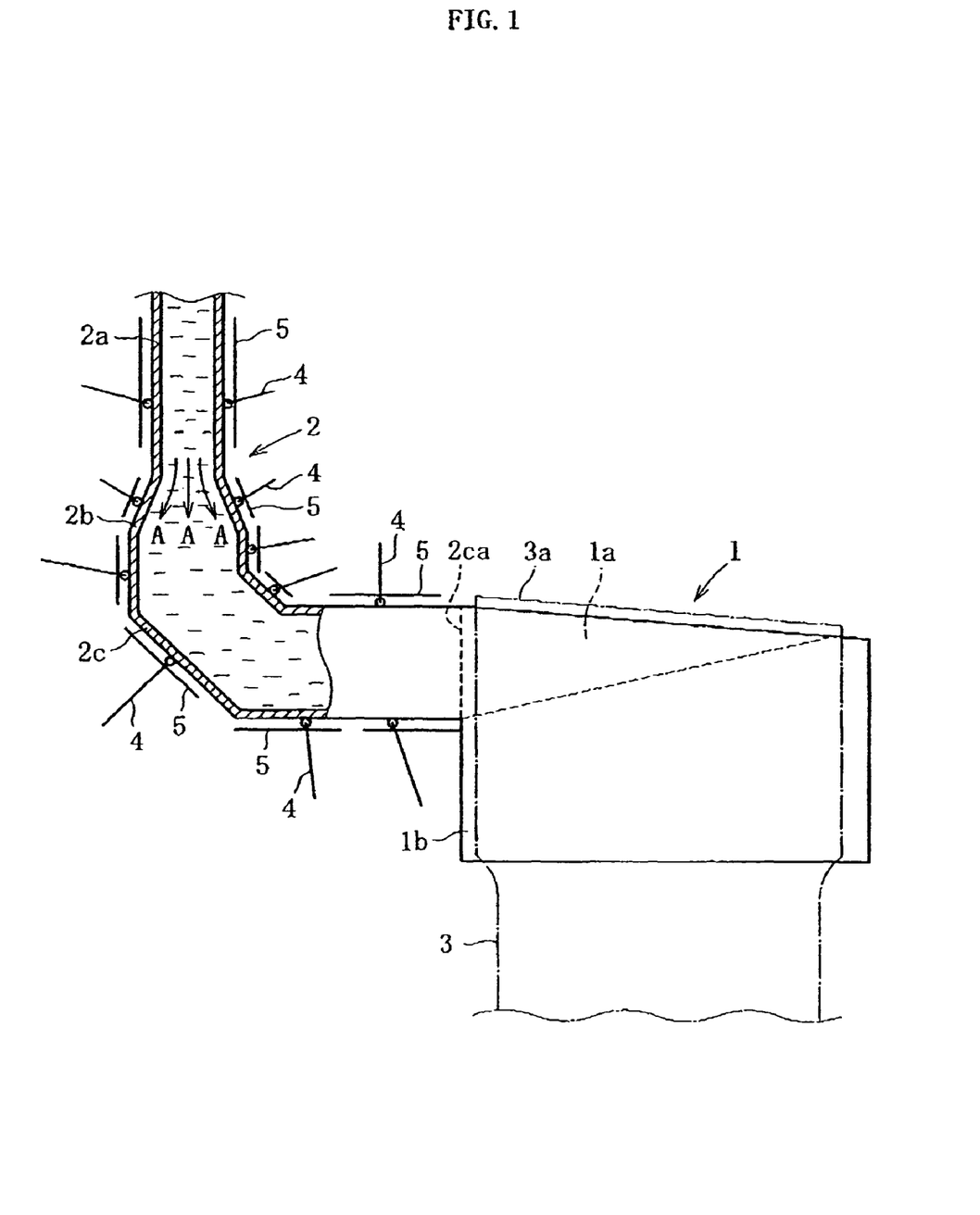
FIG. 1 is a schematic broken front view of essential parts showing a device for manufacturing sheet glass according to a first embodiment of the present invention.

According to the device for manufacturing sheet glass with aforementioned structure, the molten glass flowing down in the small diameter tube portion 2a generates a flow along the inner surface of the expanded diameter tube portion 2b as indicated by the arrows A in FIG. 1 when passing through the expanded diameter tube portion 2b. Then, the flow passes through the large diameter tube portion 2c to be supplied to the overflow vessel 1a in the forming furnace 1. As described above, the flow indicated by the arrows A is generated in the expanded diameter tube portion 2b while the molten glass is flowing from the small diameter tube portion 2a into the large diameter tube portion 2c, eliminating the significant reduction in the flow speed or a temporarily stop of the molten glass, and avoiding the devitrification and the bubble generation caused by the reduction or stoppage of the molten glass. Therefore, the quality of the manufactured sheet glass 3 can be improved, leading to the improvement of the yield.

In addition, since the heating means 5 provided on the periphery of the small diameter tube portion 2a can control the flow rate by quickly changing temperatures over the entire flow through the center potion of the molten glass flowing down in the small diameter tube portion 2a, the supplying amount of the molten glass to the overflow vessel 1a, which is controlled by the flow rate, is also controlled with better responsiveness, and the change of the flow rate due to the change of viscosity of the supplying molten glass or the like can be quickly handled. Moreover, since the distance from the liquid level of the top of the molten glass (e.g., the liquid level of the molten glass in the vessel placed in the upstream end of the small diameter tube portion 2a) to an overflow surface 3a of the molten glass in the overflow vessel 1a, i.e., the head length, can be sufficiently maintained, the change of the flow rate with respect to the change of the liquid level of the molten glass is reduced, and it is possible to stably supply the molten glass from the downstream end 2ca of the large diameter tube portion 2c to the overflow vessel 1a in the forming furnace 1.

Figure 2:
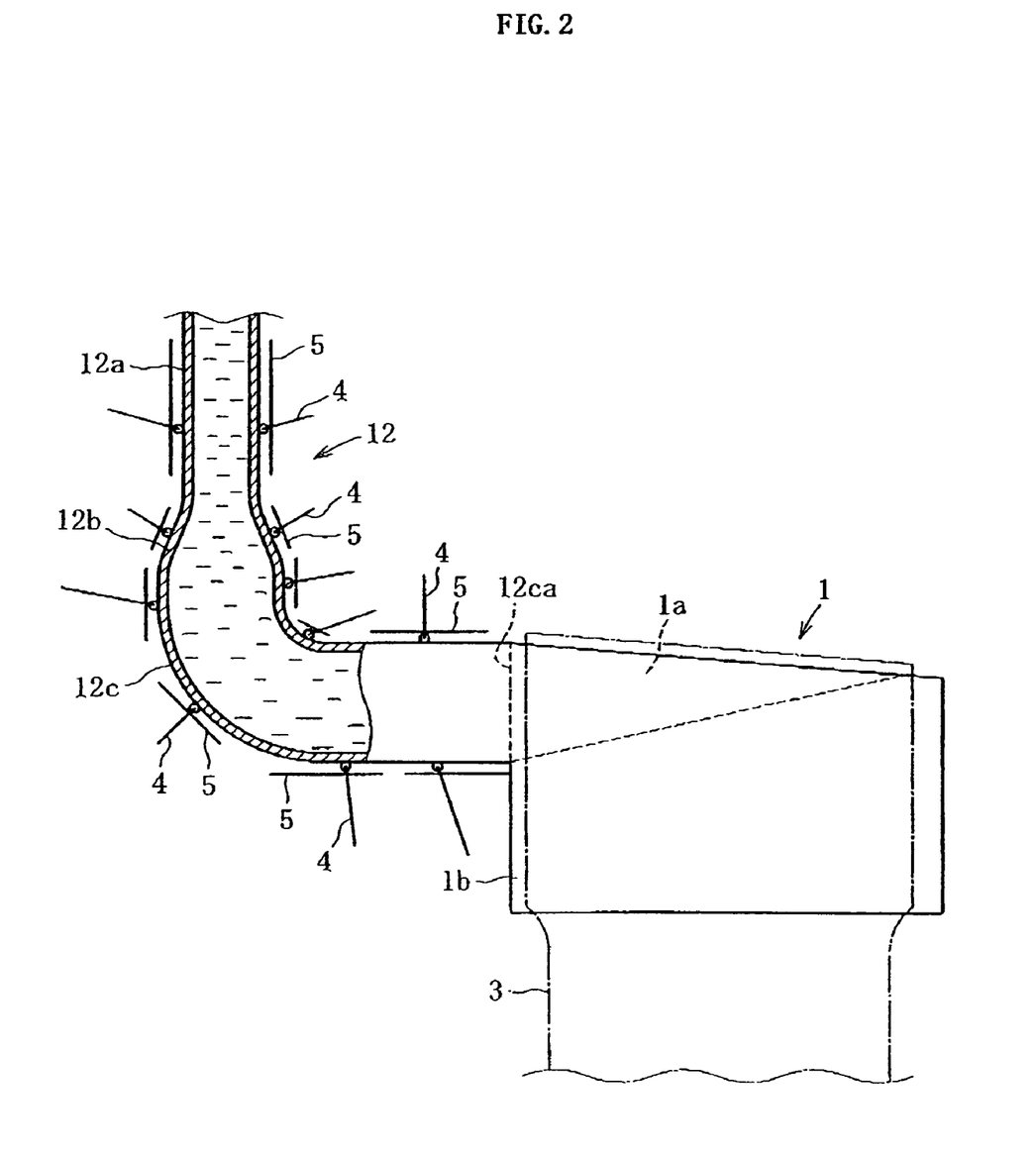
FIG. 2 is a schematic broken front view of essential parts showing a device for manufacturing sheet glass according to a second embodiment of the present invention.

FIG. 2 shows a device for manufacturing sheet glass according to a second embodiment of the present invention. The device for manufacturing sheet glass according to the second embodiment is distinguished from that of the first embodiment, in that a connection portion between a downstream end of a small diameter tube portion 12a and an upstream end of an expanded diameter tube portion 12b is curved, a connection portion between an downstream end of the expanded diameter tube portion 12b and an upstream end of a large diameter tube portion 12c is curved, and a diverting portion of the large diameter tube portion 12c is also curved. In other words, the supplying tube 12 does not have any bent portion. With this structure, the flow of the molten glass, which is supplied from the small diameter tube portion 12a to the overflow vessel 1a through the expanded diameter tube portion 12b and the downstream end 12ca of the large diameter tube portion 12c, is smoother, and thus the likelihood of devitrification or bubble generation is extremely reduced. Since the other structures of the second embodiment are identical with those of the first embodiment, the other structural elements in FIG. 2 are denoted by the same reference numerals as in the first embodiment and the description thereof is omitted.

The devices for manufacturing sheet glass according to the first and second embodiments are formed such that the small diameter tube portion, the expanded diameter tube portion, and the large diameter tube portion, which constitute the supplying tube, are integrally and continuously connected to one another, but the present invention is not limited to this structure and may be structured as follows.

Figure 3A:
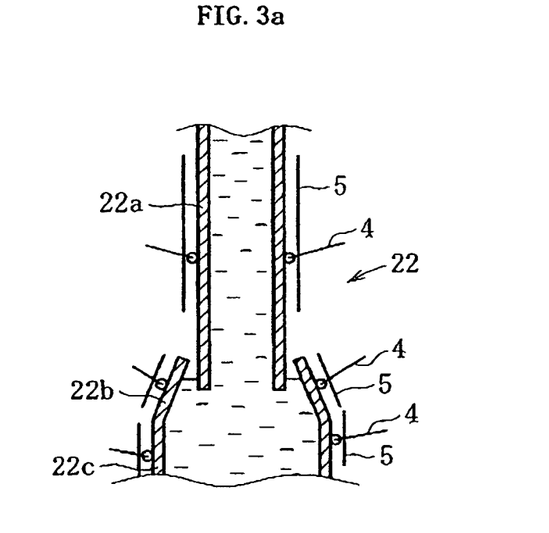
FIG. 3a is a longitudinal front view showing essential parts of the device for manufacturing sheet glass according to a third embodiment of the present invention.

In a third embodiment of the present invention shown in FIG. 3a, a supplying tube 22 is divided into a small diameter tube portion 22a having a substantially constant diameter, and an expanded diameter tube portion 22b and a large diameter tube portion 22c which are integrally and continuously connected to each other, and a downstream end portion of the small diameter tube portion 22a is inserted into an upstream end portion of the expanded diameter tube portion 22b to be overlapped with each other. Even with such structure, it is possible to suppress a rapid change of the flow rate of the molten glass supplied from the downstream end of the large diameter tube portion 22c to the overflow vessel in the forming furnace, and sufficiently suppress the devitrification or the bubble generation caused by the partial reduction in flow speed or stoppage of the molten glass, as compared with the conventional art.

Figure 3B:
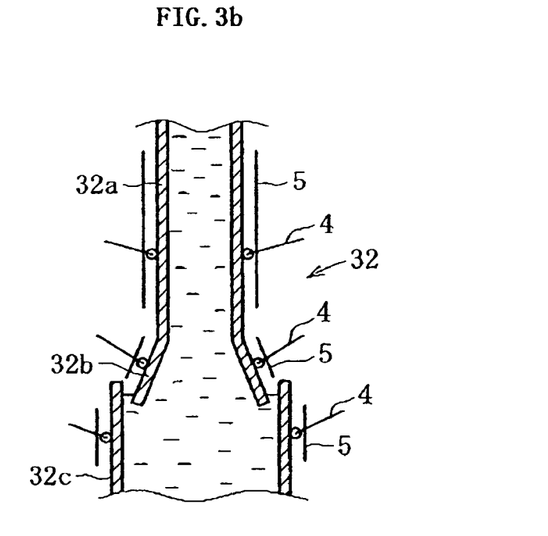
FIG. 3b is a longitudinal front view showing essential parts of the device for manufacturing sheet glass according to a fourth embodiment of the present invention.

In a fourth embodiment of the present invention shown in FIG. 3b, a supplying tube 32 is divided into a small diameter tube portion 32a and an expanded diameter tube portion 32b which are integrally and continuously connected to each other, and a large diameter tube portion 32c having a substantially constant diameter, and a downstream end portion of the expanded diameter tube portion 32b is inserted into an upstream end portion of the large diameter tube portion 32c to be overlapped with each other. Even with such structure, the similar effect to the aforementioned third embodiment can be enjoyed.

Figure 3C:
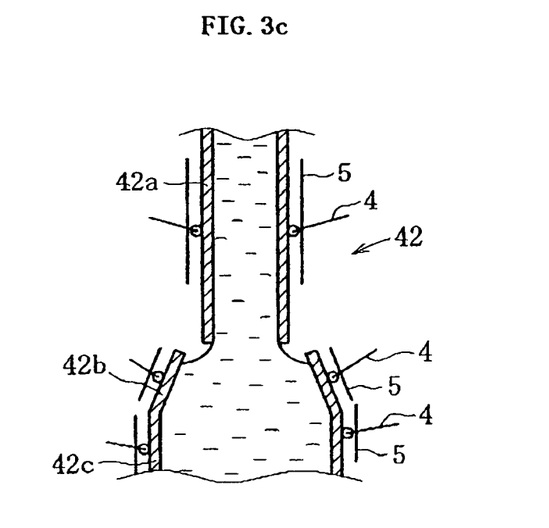
FIG. 3c is a longitudinal front view showing essential parts of the device for manufacturing sheet glass according to a fifth embodiment of the present invention.

In a fifth embodiment of the present invention shown in FIG. 3c, likewise to the aforementioned third embodiment, a supplying tube 42 is divided into a small diameter tube portion 42a having a substantially constant diameter, and an expanded diameter tube portion 42b and a large diameter tube portion 42c which are integrally and continuously connected to each other, and the surface of the molten glass flowing from the small diameter tube portion 42a into the expanded diameter tube portion 42b is set to be a free surface. In this case, the downstream end portion of the small diameter tube portion 42a may be inserted into the upstream end portion of the expanded diameter tube portion 42b to be overlapped with each other, but can be inserted such that both tube portions 42a, 42b are not overlapped with each other as shown in the figure. Even with such structure, the substantially similar effect to the aforementioned third embodiment can be enjoyed.

Figure 3D:
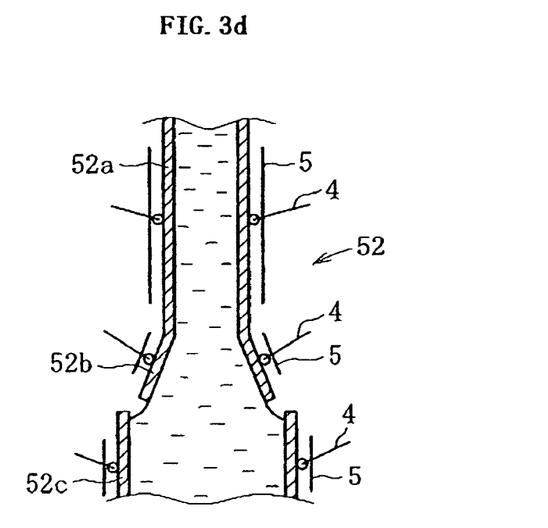
FIG. 3d is a longitudinal front view showing essential parts of the device for manufacturing sheet glass according to a sixth embodiment of the present invention.

In a sixth embodiment of the present invention shown in FIG. 3d, likewise to the aforementioned fourth embodiment, a supplying tube 52 is divided into a small diameter tube portion 52a and an expanded diameter tube portion 52b which are integrally and continuously connected to each other, and a large diameter tube portion 52c having a substantially constant diameter, and the surface of the molten glass flowing from the expanded diameter tube portion 52b into the large diameter tube portion 52c is set to be a free surface. Also in this case, a downstream end portion of the expanded diameter tube portion 52b is inserted into an upstream end portion of the large diameter tube portion 52c to be overlapped with each other, but can be inserted such that the both tube portions 52b, 52c are not overlapped with each other as shown in the figure. Even with such structure, the substantially similar effect to the aforementioned third embodiment can be enjoyed.

In the above embodiments, the present invention is applied to the cases where the sheet glass is formed by the overflow down-draw process, but may also be applied to the cases where the sheet glass is formed by the slot down-draw process.

INDUSTRIAL APPLICABILITY

It is preferable that the present invention is used in a manufacturing process of a sheet glass, which is used in the manufacture of a glass panel for various image displaying devices such as a liquid crystal display, a plasma display, an electroluminescent display, a field emission display, or a sheet glass used as a substrate material for forming various electronic display functional devices or thin films.

What is claimed is:

1. A device for manufacturing sheet glass constituted such that the sheet glass is continuously formed by continuously directing molten glass flowing out of a melting furnace through a supplying tube to a forming vessel in a forming furnace,
wherein the supplying tube includes
a small diameter tube portion, which extends in a vertical direction and has a small flow passage area, provided at an upstream side,
a large diameter tube portion, which has a large flow passage area, provided at a downstream side, the large diameter tube portion having an upstream end portion extending in the vertical direction, a downstream end portion extending in a horizontal direction, and an intermediate portion transitioning from the vertical direction to the horizontal direction, and
an expanded diameter tube portion, which has a gradually expanding flow passage area toward the downstream side, interposed between the small diameter tube portion and the large diameter tube portion, and
wherein the small diameter tube portion, the expanded diameter tube portion, and the large diameter tube portion are integrally and continuously connected to one another.

2. The device for manufacturing sheet glass of claim 1, wherein the small diameter tube portion is provided with heating means for controlling a flow rate of the molten glass supplied to the forming vessel in the forming furnace through the large diameter tube portion.

3. The device for manufacturing sheet glass of claim 1, wherein the forming vessel in the forming furnace is a groove-shaped overflow vessel formed on an upper portion of a formed body having an approximately wedge-shaped cross-section.

4. A method for manufacturing sheet glass, the method comprising:
continuously directing molten glass flowing out of a melting furnace to a forming vessel in a forming furnace through a supplying tube; and
continuously forming the sheet glass,
wherein the continuously directing of the molten glass comprises continuously directing the molten glass through the supplying tube including
a small diameter tube portion, which extends in a vertical direction and has a small flow passage area, provided at an upstream side,
a large diameter tube portion, which has a large flow passage area, provided at a downstream side, the large diameter tube portion having an upstream end portion extending in the vertical direction, a downstream end portion extending in a horizontal direction, and an intermediate portion transitioning from the vertical direction to the horizontal direction, and
an expanded diameter tube portion, which has a gradually expanding flow passage area toward the downstream side, interposed between the small diameter tube portion and the large diameter tube portion, and
wherein the small diameter tube portion, the expanded diameter tube portion, and the large diameter tube portion are integrally and continuously connected to one another.

5. The method for manufacturing sheet glass of claim 4, further comprising controlling a flow rate of the molten glass supplied into the forming vessel in the forming furnace through the large diameter tube portion by controlling a temperature of the molten glass flowing down in the small diameter tube portion.

6. The method for manufacturing sheet glass of claim 4, wherein the continuously forming of the sheet glass comprises continuously forming the sheet glass by an overflow down-draw process.

7. A device for manufacturing sheet glass, the device comprising:
a melting furnace for generating molten glass;
a forming furnace including a forming vessel for forming sheet glass from the molten glass; and
a supplying tube for supplying the molten glass from the melting furnace to the forming furnace, wherein the supplying tube includes:
a small diameter tube portion, which extends in a vertical direction and has a small flow passage area, provided at an upstream side;
a large diameter tube portion, which has a large flow passage area, provided at a downstream side, the large diameter tube portion having an upstream end portion extending in the vertical direction, a downstream end portion extending in a horizontal direction, and an intermediate portion transitioning from the vertical direction to the horizontal direction; and an expanded diameter tube portion, which has a gradually expanding flow passage area toward the downstream side, interposed between the small diameter tube portion and the large diameter tube portion, and wherein the small diameter tube portion, the expanded diameter tube portion, and the large diameter tube portion are integrally and continuously connected to one another.

8. The device for manufacturing sheet glass of claim 7, further comprising a heater located at the small diameter tube portion, the heater for heating the molten glass to control a flow rate of the molten glass supplied to the forming vessel in the forming furnace through the large diameter tube portion.

9. The device for manufacturing sheet glass of claim 7, wherein the forming vessel in the forming furnace is a groove-shaped overflow vessel formed on an upper portion of a formed body having an approximately wedge-shaped cross-section.

* * * * *